(12) United States Patent
Pumpelly

(10) Patent No.: US 7,975,620 B2
(45) Date of Patent: Jul. 12, 2011

(54) HYBRID PERSONAL TRANSIT SYSTEM

(76) Inventor: Thomas Pumpelly, Mason Neck, VA (US)

( * ) Notice: Subject to any disclaimer, the term of this patent is extended or adjusted under 35 U.S.C. 154(b) by 67 days.

(21) Appl. No.: 12/352,657

(22) Filed: Jan. 13, 2009

(65) Prior Publication Data

US 2010/0011986 A1 Jan. 21, 2010

Related U.S. Application Data

(60) Provisional application No. 61/129,754, filed on Jul. 16, 2008.

(51) Int. Cl.
*B61F 1/00* (2006.01)
(52) U.S. Cl. .................... 105/215.2; 105/72.2
(58) Field of Classification Search ........... 105/215.1, 105/215.2, 72.2, 463.1; 104/288, 88.03, 104/88.04, 88.02, 118, 119, 120, 124, 243
See application file for complete search history.

(56) References Cited

U.S. PATENT DOCUMENTS

| | | | | |
|---|---|---|---|---|
| 5,813,349 A | * | 9/1998 | Jensen | 104/28 |
| 6,012,396 A | * | 1/2000 | Schulz | 105/72.2 |
| 6,029,104 A | * | 2/2000 | Kim | 701/20 |
| 6,095,054 A | * | 8/2000 | Kawano et al. | 104/139 |
| 6,182,576 B1 | * | 2/2001 | Svensson | 104/120 |
| 6,263,799 B1 | * | 7/2001 | Pardes | 104/28 |
| 6,324,994 B1 | * | 12/2001 | Glenn | 105/72.2 |
| 6,619,212 B1 | * | 9/2003 | Stephan et al. | 104/292 |
| 6,857,374 B2 | * | 2/2005 | Novacek | 104/130.07 |
| 2003/0173173 A1 | * | 9/2003 | Stephan et al. | 191/10 |
| 2003/0173174 A1 | * | 9/2003 | Stephan et al. | 191/10 |
| 2006/0201376 A1 | * | 9/2006 | Brigham | 104/130.07 |
| 2007/0289477 A1 | * | 12/2007 | Sobolewski | 105/215.2 |
| 2010/0011986 A1 | * | 1/2010 | Pumpelly | 105/215.2 |
| 2010/0043665 A1 | * | 2/2010 | Brigham | 104/88.01 |

FOREIGN PATENT DOCUMENTS

| | | | |
|---|---|---|---|
| JP | 05162516 A | * | 6/1993 |
| JP | 2006088802 A | * | 4/2006 |

OTHER PUBLICATIONS

International Search Report dated Aug. 27, 2009 from corresponding international patent application No. PCT/US09/037918, 3 pages.

\* cited by examiner

*Primary Examiner* — S. Joseph Morano
*Assistant Examiner* — Jason C Smith
(74) *Attorney, Agent, or Firm* — Maier & Maier, PLLC

(57) ABSTRACT

A system and method for hybrid personal transit and components thereof is disclosed. The hybrid personal transit ("HPT") system can be a system of combined highway and monorail transportation methods, which allows roadworthy HPT vehicles to transition onto, and run on, a system of monorails. The rails can be built on the ground, on poles, or in tunnels. A unique drive system will allow each HPT vehicle to alter drive output from the HPT vehicle's tires to a rail drive system.

10 Claims, 10 Drawing Sheets

HYBRID PERSONAL TRANSIT SYSTEM

RELATED APPLICATIONS

This application claims priority, under 35 U.S.C. §119(e), to U.S. Provisional Patent Application Ser. No. 61/129,754, filed Jul. 16, 2008, the disclosure of which is incorporated by reference herein in its entirety.

BACKGROUND

While numerous systems of high speed transportation have been developed, including several for low occupancy vehicles, none have reached the point of general applicability to today's traveling public and certainly not to the level of attraction for individuals. None of the personal units, now operational, have developed any significant speed capability.

Many of the systems currently in operation depend on a significant infrastructure. Each system requires a user to migrate from their personal form of transportation to a system car or vehicle.

While train systems meet many of the standards of high speed, wide area transportation, they have experienced no substantial gain in ridership percentage over the recent history, and have become very expensive to construct. Personal automobiles provide much of surface transportation, and this percentage has increased over the past two decades.

To understand why rail and personal rapid transit (PRT) systems have not been successful in attracting a higher percentage of surface transportation usage, we need look no further than the psychology of the American automobile owner, and a trend that is expanding globally as automobile ownership reaches into the depths of world population.

Americans want to own or lease, for several years or longer, their automobiles, vans, sport utility vehicles and personal trucks. Pride of ownership is paramount. Vehicles may be a reflection of a person's ego and sense of worth. They are often customized and almost always chosen for their options, colors, and curb appeal. A person, under the current parameters of transportation, simply will not likely give up their pride of ownership, or the degree of flexibility that a personal vehicle offers.

SUMMARY

In at least one embodiment, a hybrid personal transit (HPT) system is disclosed. The hybrid personal rapid transit system can be a system of combined highway and monorail transportation methods, which allows roadworthy HPT vehicles to transition onto, and run on, a system of monorails. A drive system may allow each HPT vehicle to alter drive output from the HPT vehicle's tires to a rail drive system. The drive rail may facilitate communication between the HPT vehicle and a remote location, providing the ability of operate the HPT vehicle from the remote location.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION

Figure 1:
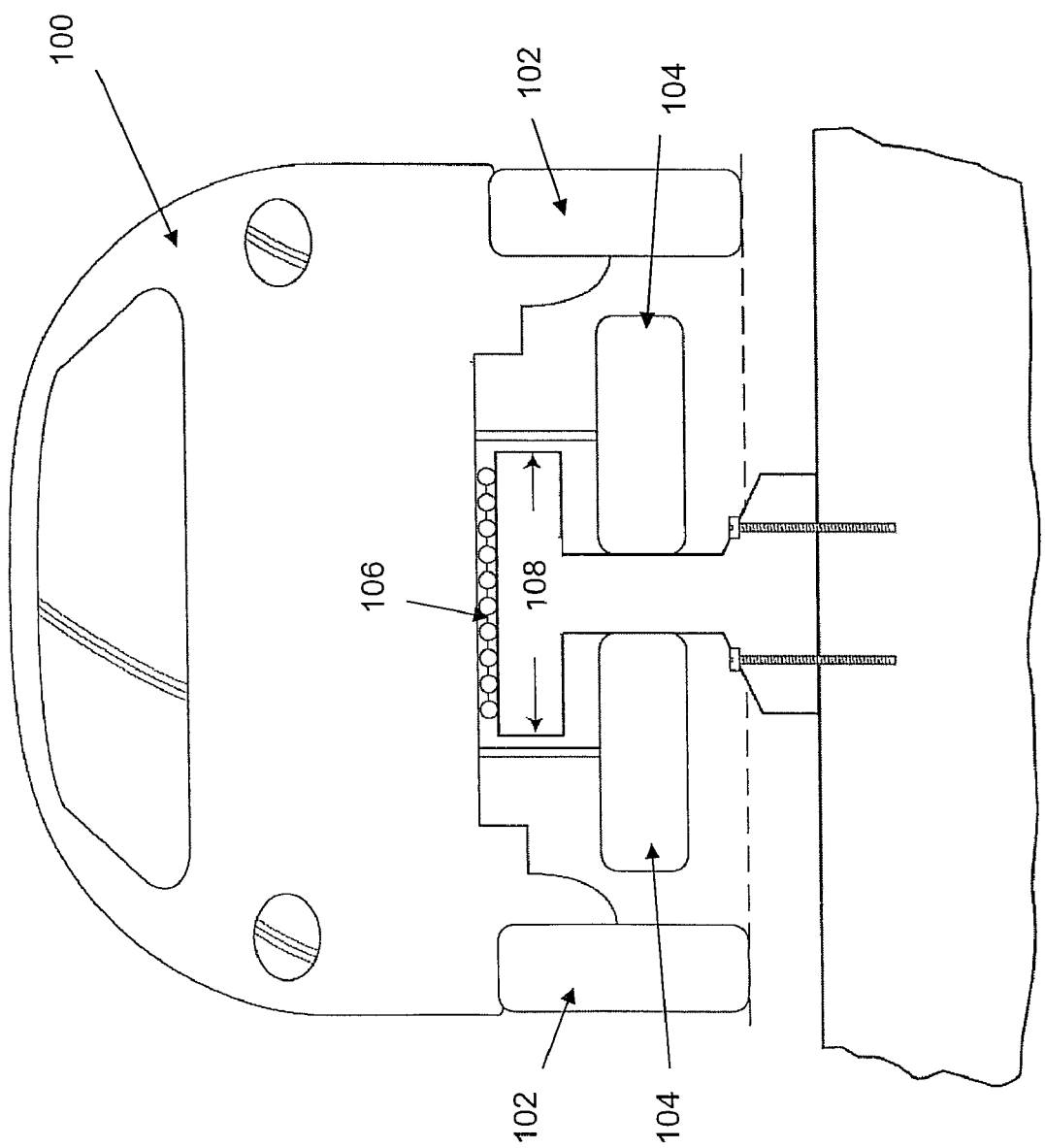
FIG. 1 is a front view of an exemplary embodiment of an HPT vehicle riding a rail.

Aspects of the HPT are disclosed in the following description and related drawings directed to specific embodiments of the HPT system. Alternate embodiments may be devised without departing from the spirit or the scope of the HPT system. Additionally, well-known elements of exemplary embodiments of the HPT system will not be described in detail or will be omitted so as not to obscure the relevant details of the HPT system. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the HPT system" or "embodiments" do not require that all embodiments of the HPT system include the discussed feature, advantage or mode of operation.

Hybrid Personal Rapid Transit/Transportation ("HPT") refers to a system of combined highway and monorail transportation methods, which may provide roadworthy HPT vehicles 100 to transition onto, and run on, a system of monorails 108. The rails 108 can be built on the ground, on poles, or in tunnels. A unique drive system may allow each HPT vehicle 100 to alter drive output from the HPT vehicle's tires 102 to a rail drive system 104.

Generally referring to FIGS. 1-10, an exemplary embodiment of an HPT vehicle 100 may be powered by a hybrid electric engine, battery operated, utilize an internal combustion engine or any other propulsion mechanism known to one skilled in the art of vehicle mechanics.

For example, an HPT vehicle can be powered by electric power, either alternating current or direct current. This electric power can be supplied by any number of sources including, but not limited to, internal generation, internal storage such as batteries or electrical current supplied by the rail system 108 through electrical supply 604, shown in FIG. 6. Other exemplary power sources may include combustion engines fueled by gasoline, diesel, hydrogen or compressed natural gas or similarly, an electrical generator fueled by gasoline, diesel, hydrogen or compressed natural gas can also be used as a power source for an HPT vehicle.

In an exemplary embodiment, as seen in FIG. 1, an HPT vehicle 100 may include standard vertical vehicle wheels 102 for conventional vehicle travel. Additionally, the HPT vehicle 100 may include horizontal drive wheels 104 designed to engage an HPT rail 108 and drive the vehicle 100 while on the rail 108. These drive wheels 104 may be made of solid rubber, air inflated rubber or any other desired shock absorbing material. Drive wheels 104 may also be powered and provide propulsion during the vehicle's 100 transit on the rail 108.

In another exemplary embodiment, an HPT vehicle 100 may include modified vehicle wheels 102 that be facilitate driving in a conventional roadway with the wheels 102 in a conventional vertical position and then these same wheels may be retracted to a substantially horizontal position in order to engage a rail 108. This retraction of the wheels 102 from a vertical position to a horizontal position may be facilitated by a suspension system that operator controlled or automatically controlled wheel 102 positioning during conventional driving and during driving on the rail system 108.

An exemplary suspension system may include, for example an hydraulic actuator that may produce the requisite pressure to facilitate the desired positioning of wheels 102 during conventional or rail 108 use. The hydraulic actuator may be powered by an engine of the HTP vehicle 100, by electrical power, by reverse hydraulic operation or any other desired power source.

Another exemplary suspension system may include, for example an air compression actuator that may produce the requisite pressure to facilitate the desired positioning of wheels 102 during conventional or rail 108 use. The air compression actuator may be powered by an engine of the HTP vehicle 100, by electrical power, by reverse air compression operation, an alternate component of the HTP vehicle 100, return springs or any other desired power source. Additionally, the exemplary suspension system may include any desired combination of hydraulic and air compression actuation, coupled with natural gravity forces, that may produce the requisite pressure to facilitate the desired positioning of wheels 102.

Figure 2:
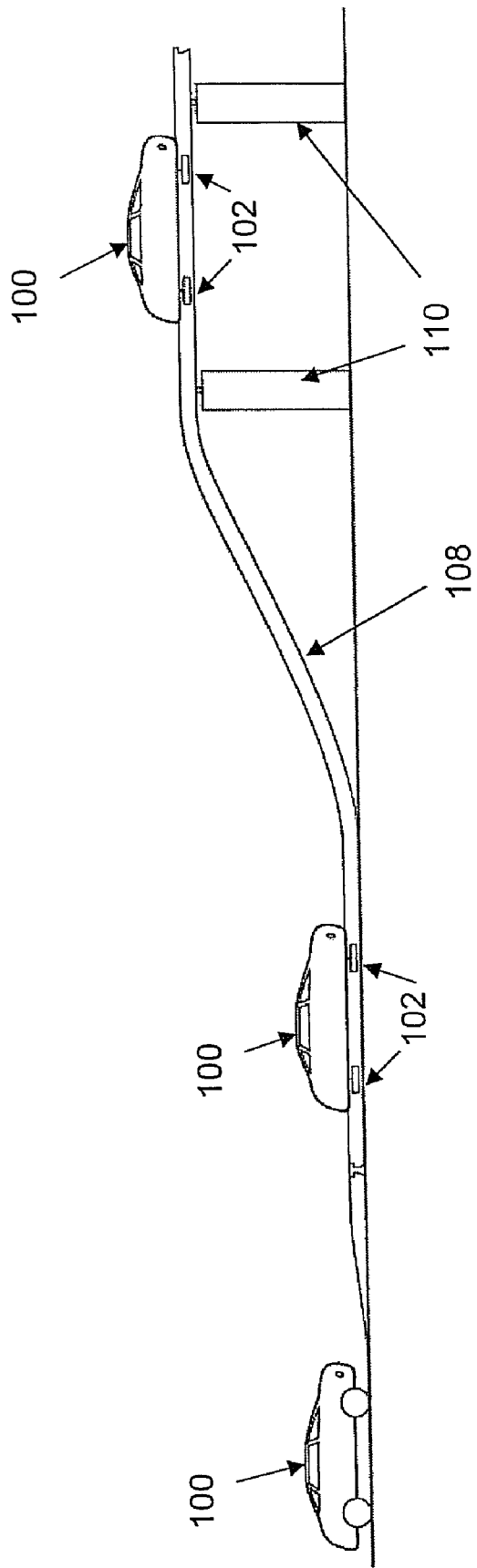
FIG. 2 is a side view of an exemplary embodiment of a HPT system, including HPT vehicles and a rail.
Figure 3:
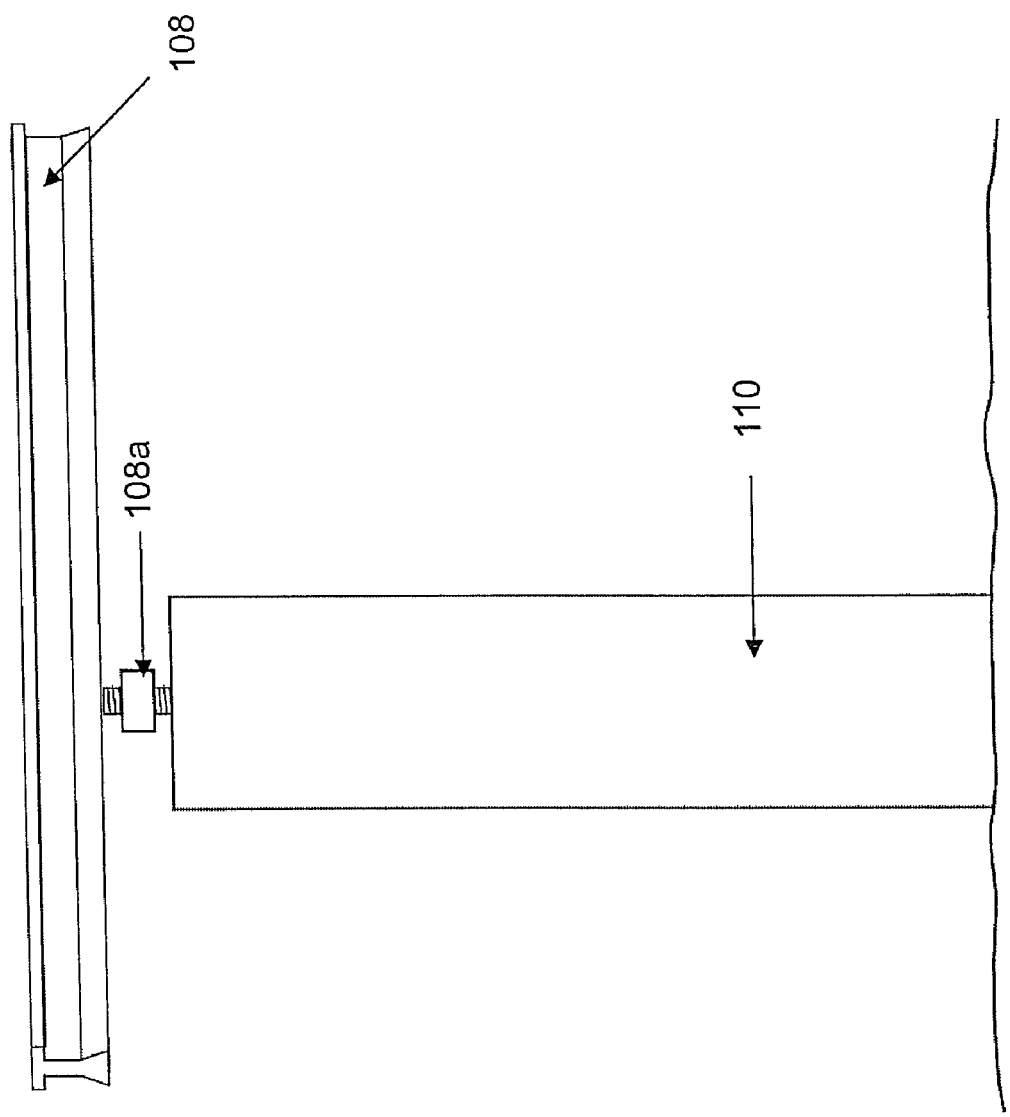
FIG. 3 is a perspective view of an exemplary embodiment of an HRPT rail.
Figure 4:
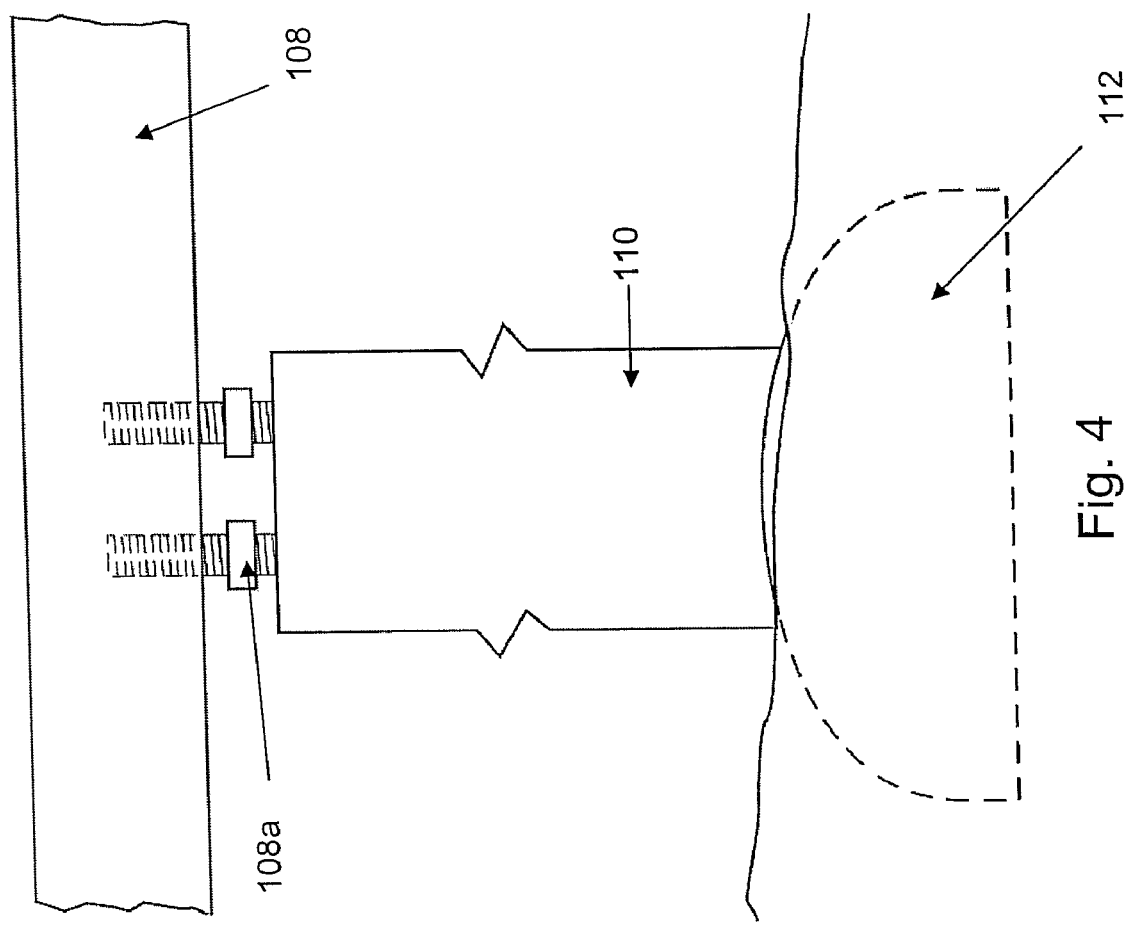
FIG. 4 is a side view of an exemplary embodiment of an HRPT rail.
Figure 9:
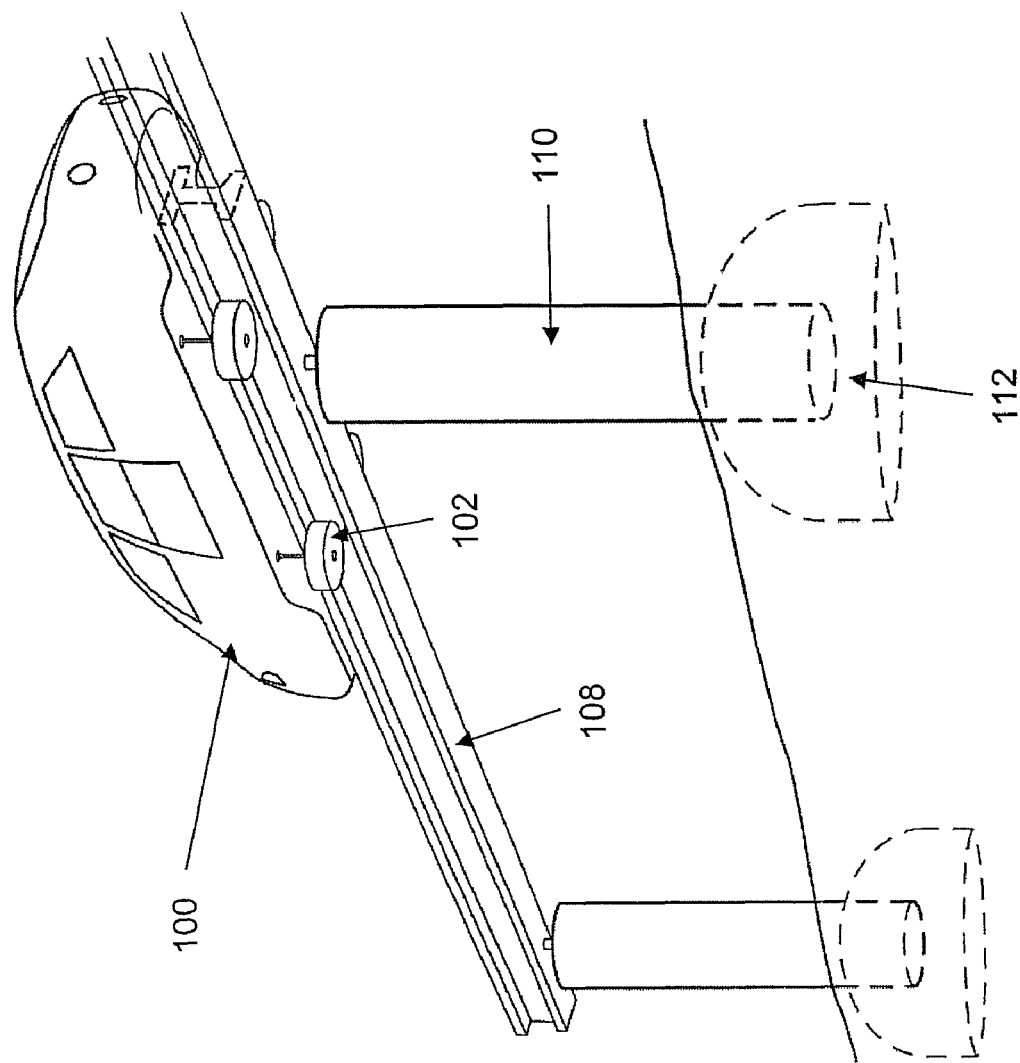
FIG. 9 is another perspective view of an HPT system with an HPT vehicle and rail.

In an exemplary embodiment, HTP vehicle 100 may integrate user initiated controls in order to facilitate the desired positioning of wheels 102, either vertical or horizontal, through initiation of the previously mentioned suspension system. These suspension controls may include, for example, electrical, hydraulic, pneumatic or any other desired control system. As shown in FIGS. 2 and 9, the suspension control system may enable a user to control the positioning of the wheels 102 while approaching, traveling on and exiting the rail system 108.

The suspension controls may also be incorporated into a computerized system that may control all aspects of the positioning of the suspension system from a remote location. This remote location, for example, may initiate the positioning of the suspension system and thereby the wheels 102, during the HPT vehicles approach and exit from the rail system.

An HPT rail 108 may be manufactured in an I-beam type configuration, as seen in FIGS. 1, 3 and 6-9. This I-beam type design can enable the horizontal wheels 105 of the HPT vehicle to secure the vehicle 100 to the rail 108 during transit. Additional support wheels may also be added and may be configured in a vertical, horizontal or diagonal configuration. In another exemplary embodiment, rail 108 may include a high speed bearing plate 106 on the top surface, as seen in FIG. 1. This bearing plate 106 may improve the turbulence distributed to the vehicle 100 during transit on the rail 108, as well as, decrease the friction between the vehicle 100 and the rail 108, whereby increasing the actual and potential speed of the vehicle 100 during transit on the rail 108.

In an exemplary embodiment, the bearing plate 106 may include tire and wheel sets coupled to the bearing plate via conventional axial configurations and the tires can be designed to run along a top portion of a rail 108. These tire and wheel sets can be pneumatic or made of shock absorbing materials such as rubber, for example. The number and size of tire and wheel sets may vary and may include as many tire and wheel sets as desired.

Another exemplary bearing plate 106 may include a variety of rollers, wheels or drums. Such rolling elements may be surfaced with any desired material designed to reduce friction and/or dissipate heat, for example, rubber or plastic. The rolling elements may also be made of metal or any other structure capable of retaining shape and supporting the weight of the HPT system. In a further exemplary embodiment, the positioning of bearing plate 106 may be manipulated by an onboard control system or some other desired remote location.

Figure 10:
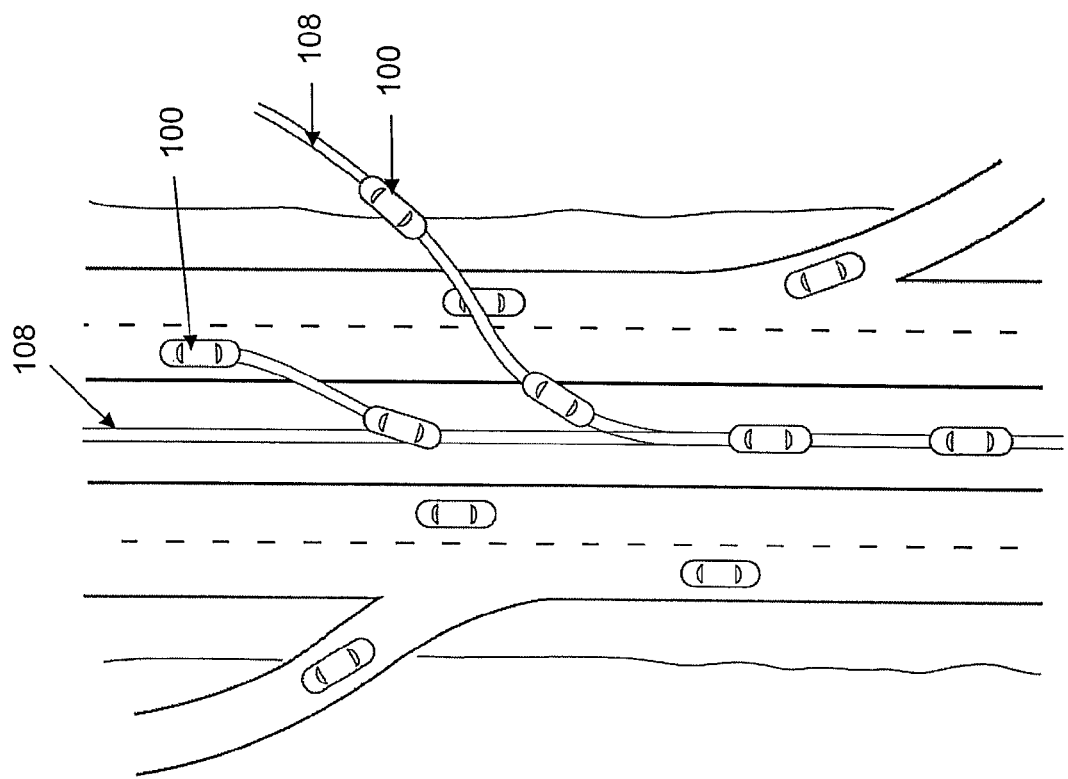
FIG. 10 is top view of an exemplary embodiment of an HPT system in relation to a conventional vehicle highway.

In another exemplary embodiment of the HPT system, a series of rails 108 may operate in conjunction with one another forming a grid, as seen in FIG. 10. During operation of the HPT system, an operator of an HPT vehicle 100 may arrive at a grid entrance, where the HPT vehicle 100 may be operated electronically by a series of onboard 800 and stationary grid computers 602. A vehicle operator may engage a grid system through a special lane which may provide a smooth, merging transition onto the grid system.

In an exemplary embodiment, an onboard operating system 800 may communicate with grid operating systems 602 ("the brain") which may provide automatic operation, or free of vehicle operator operation, of the vehicle 100 during its interaction with the grid and HPT system. The HPT vehicle 100 may run on conventional tires 102 during the approach to the rail 108 and grid system.

In another exemplary embodiment, an HPT vehicle 100 is identified as being registered for access on the rail 108 and grid system, for example, through an electronic identification tag or "Transponder" or any other desired registration system. The brain 602 of the HPT system may send the approaching HPT vehicle 100 a signal to conduct a series of electronic diagnostic checks to make certain that the required systems on the HPT vehicle may be working properly for safe access onto the rail 108 and pending transit.

For example, the diagnostic checks may include sufficient battery charge (or fuel quantity for automobiles with traditional propulsion systems), vehicles brake pad thickness is electronically checked or any other designated or desired diagnostic checks. Additionally, the HPT vehicle's on-board operating system 800 may be checked for strength of signal and full interaction with the brain 602. In an exemplary embodiment of the HPT system, if required functions of the HPT vehicle 100 are not in compliance with the HPT system requirements, the HPT vehicle 100 may be diverted to a lane which may return to conventional highway lanes.

In another exemplary embodiment, the rail 108 may be made of, for example, seamless concrete and metal rail or any other robust material that may provide a smooth and sufficiently strong material to support multiple HPT vehicles 100 traveling along the rail 108. There may be little tolerance between the drive wheels 104 and the rail 108 which may be uniform and without substantial surface deviations that may cause turbulence in conventional roadways. In yet another exemplary embodiment, the HPT vehicle 100 may be alternatively or additionally equipped with a magnetic levitation feature which may reduce turbulence in the vehicle 100 and increase the speed capabilities of the vehicle 100.

The HPT vehicle may also be equipped with a dash light which may indicate when a vehicle operator must enter required information into the onboard operating system 800. This information may include, for example, the desired exit returning the vehicle 100 to the convention roadway. If certain required information is not entered the vehicle may be exited off the rail 108 at the next available exit. Additionally, if a vehicle operator is unfamiliar with the required information the onboard operating system may prompt the vehicle operator with possible selections. The HPT system brain 602 may also exit the vehicle 100 off the rail 108 in emergency-type situations that may be initiated by the vehicle operator or the brain 602 itself.

Figure 6:
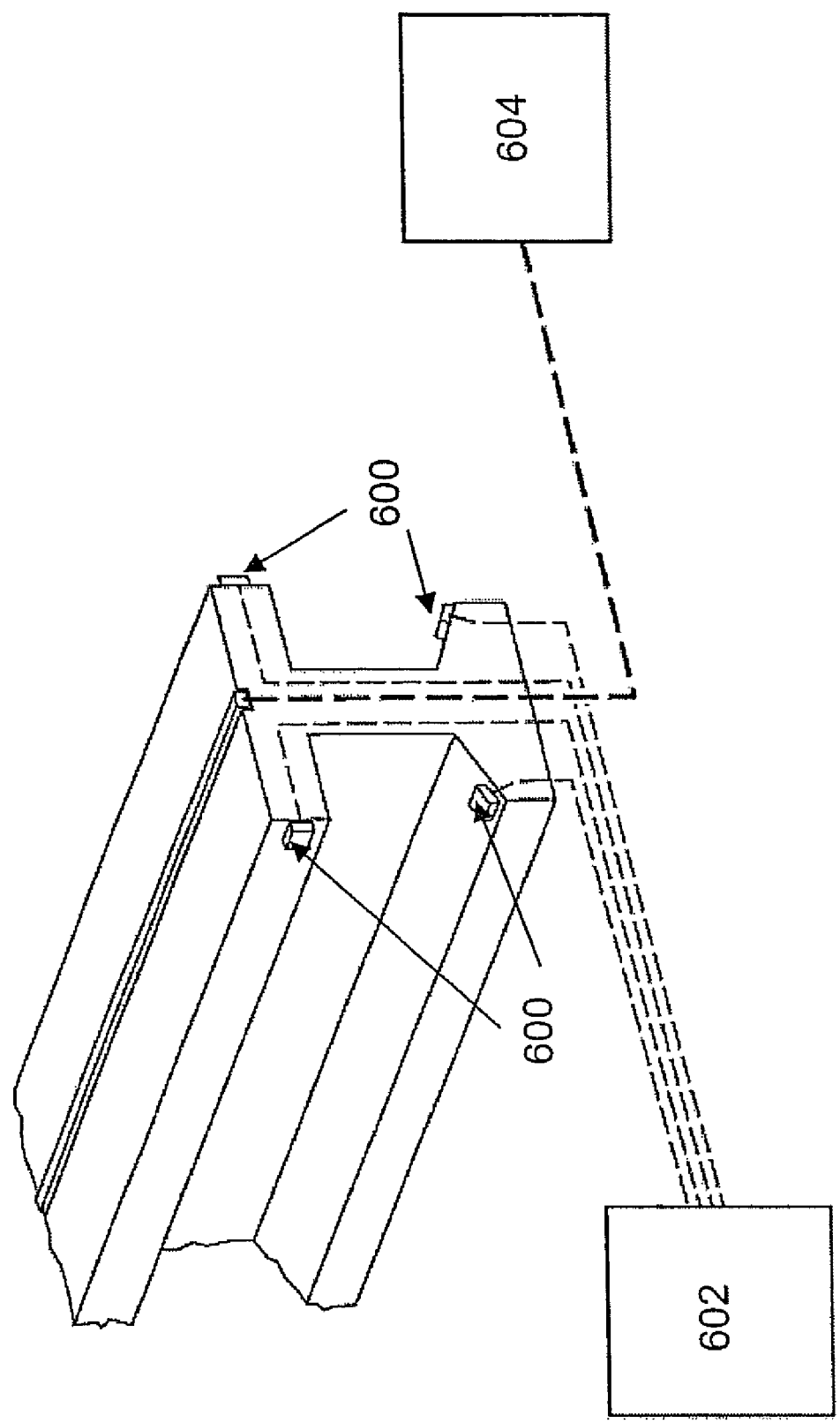
FIG. 6 is a perspective cross-sectional view of an exemplary embodiment of a HRTP rail.
Figure 7:
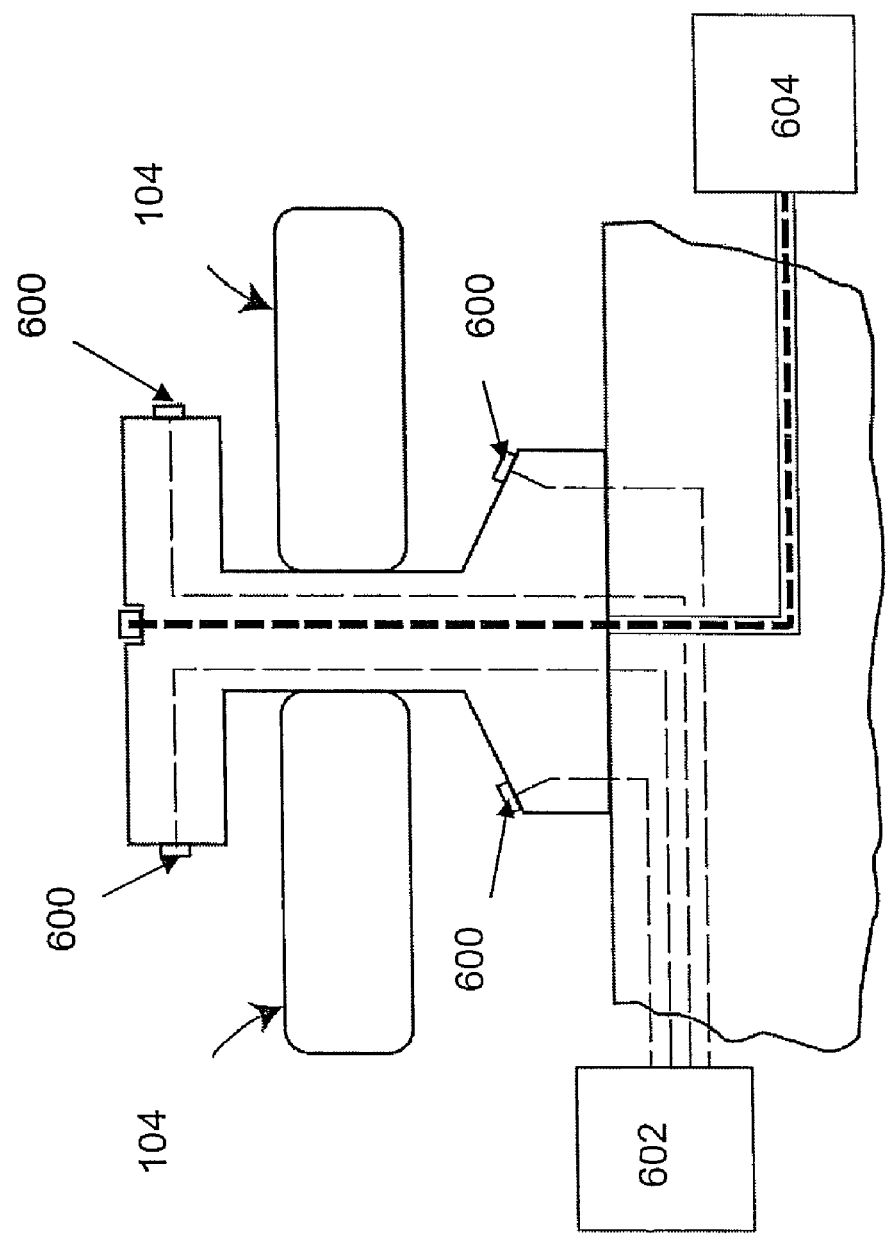
FIG. 7 is a cross-sectional schematic view of an HPT rail and system.
Figure 8:
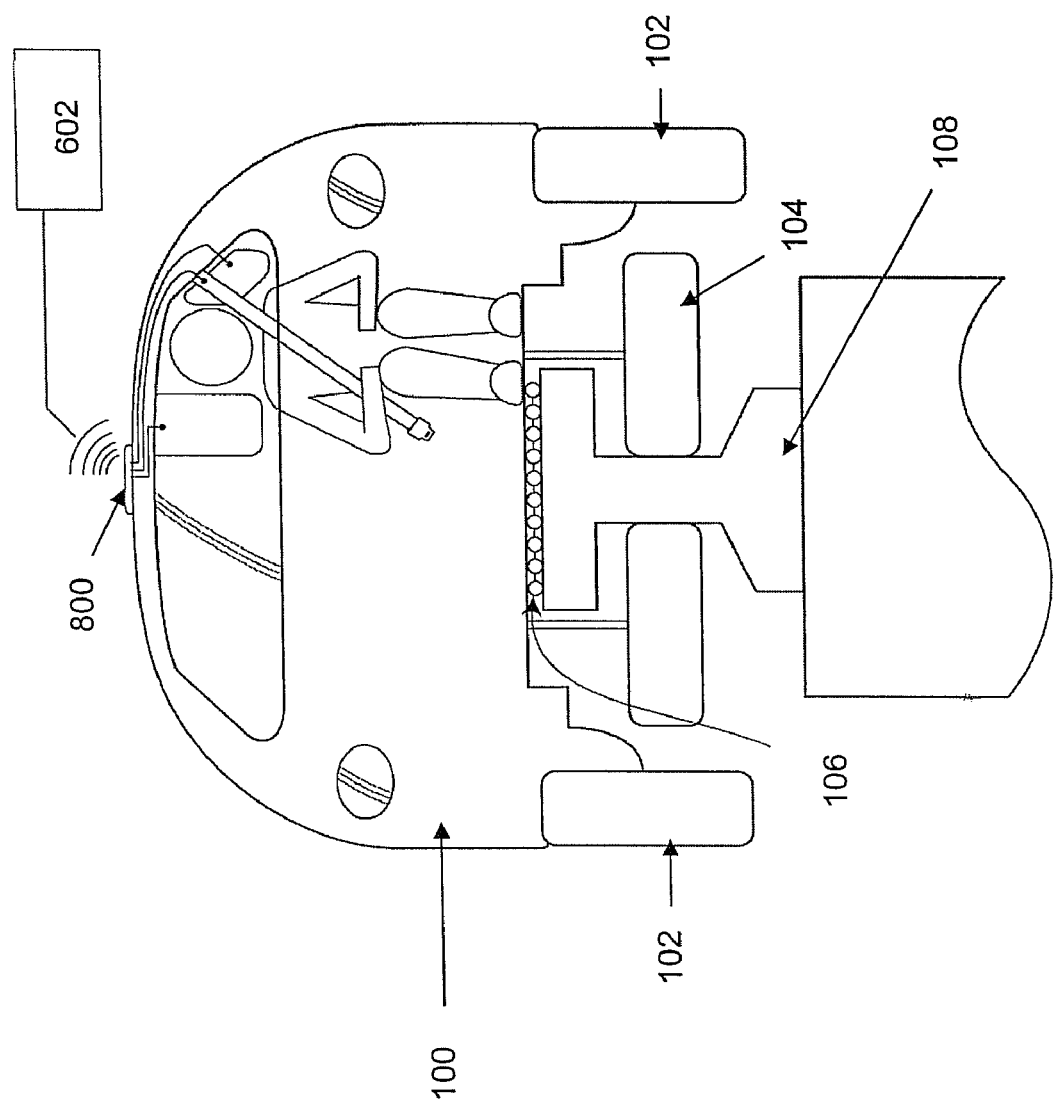
FIG. 8 is front view of an exemplary embodiment of an HPT vehicle in communication with the brain of the HPT system.

As seen in FIGS. 6-8, the HPT vehicle 100 may communicate with the brain 602 at designated intervals, for example, every 6 feet, via sensors 600 placed along the rail 108. These sensors 600 may come into direct contact with the vehicle or may communicate with the vehicle trough electronic signals sent by the brain 602. The brain may communicate with the HPT vehicle 100 and at each sensor and determine, for example, how fast the HPT vehicle 100 is moving, the rate of acceleration, the exact speed the HPT vehicle 100 and any other desired information that may be necessary for the brain 602 monitor and control the HPT vehicle 100. Additionally, a power source 604 may be incorporated into the rail 108 and provide additional power to HPT vehicle 100 and the other electrical operating systems of the HPT system.

Figure 5:
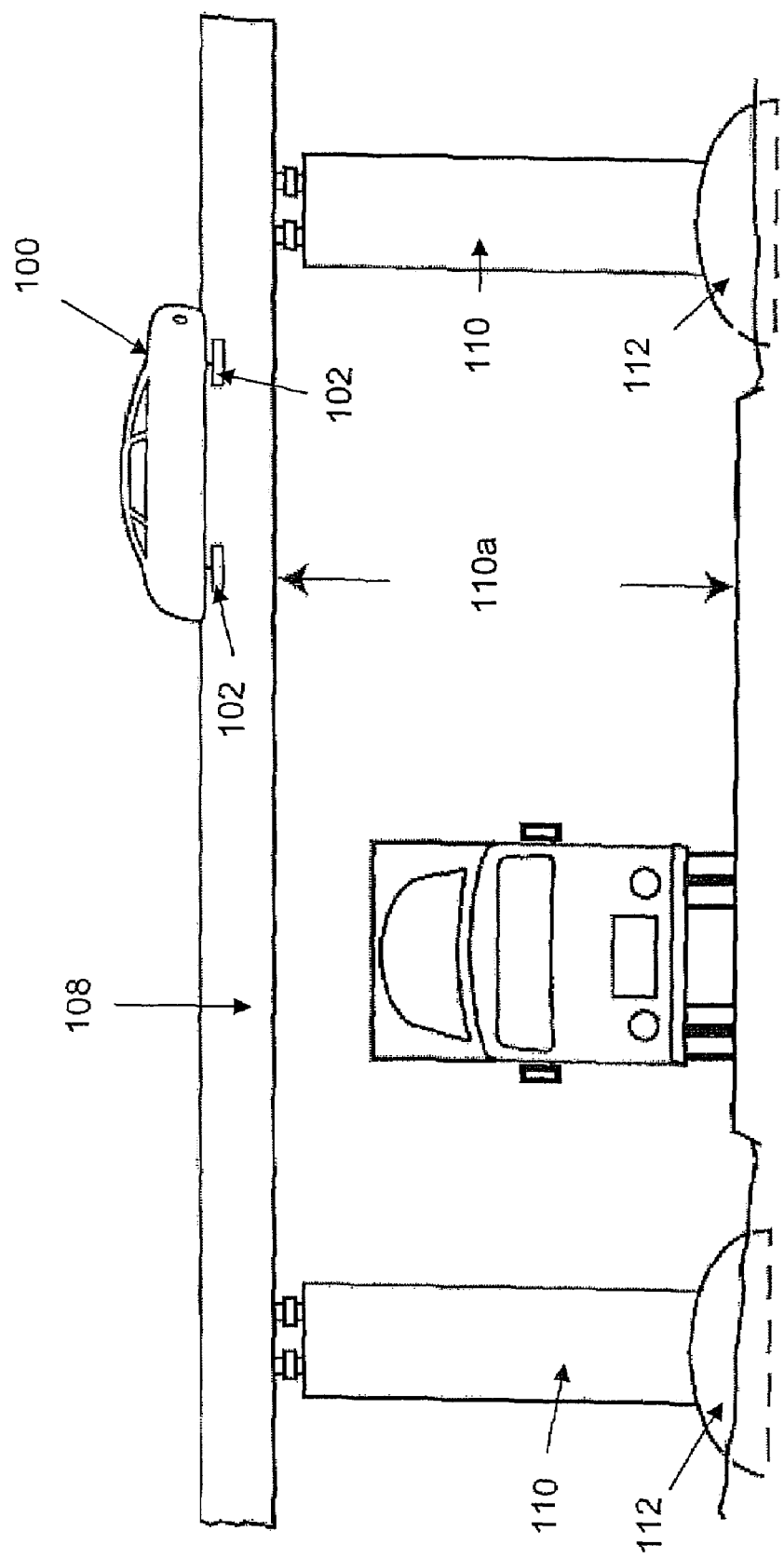
FIG. 5 is side view of another exemplary embodiment of an HRPT system.

In another exemplary embodiment the HPT rails 108 may be built on pillars 110 rising away from the ground, as seen in FIGS. 2-5 and 9. The rails 108 may secured to the pillars via bolts 108a or any other desired securing mechanism. These pillars 110 may be supported underneath the surface of the ground by large anchors 112. These anchors 112 can be made in any desired shape or size which may add additional support to the pillars 110 and the rail 108. Pillars 110 may be formed in any desired height 110a, for example, sufficiently high to provide clearance for any vehicles that may travel below the rail 108, as shown in FIG. 5.

During operation drive wheels 104 on the HPT vehicle 100 may retract slightly away from the rail 108, thereby, possibly providing a smoother and more efficient transit on the rail 108. If for example, the HPT vehicle 100, through the use of the onboard operation system 800, senses a loss of magnetic levitation energy, during magnetic levitation use, the drive wheels 104 will immediately re-take control of the vehicle 100 and the internal engine may engage for onboard propulsion. If magnetic levitation is not in use, the vehicle 100 may remain connected to the rail 108 by the drive wheels 104.

The brain 602 may control the HPT vehicle 100 and may subsequently control the interaction and transit flow patterns of multiple HPT vehicles 100. For example, the brain 602 may cause the vehicle to speed up and join with a group of vehicles 100 in front of it, or it will remain at designated speed and let the vehicles 100 behind it catch up. Once coupled, an HPT vehicle 100 may either lead, or be the caboose, of a train of vehicles 100, at least for a few moments. In another exemplary embodiment, the brain 602 may recognize the fuel and energy efficiencies in controlling the flow of transit along the rail 108 and determining designated speeds and "train" organizations of the HPT vehicles 100.

Additional features of an HPT vehicle may also include an electronic cloaking effect can be used to fully shade the windows of the HPT vehicle if vehicle operator wants to have some privacy, the vehicle operator can elect to see the scenery outside or block out the view completely. The HPT vehicle may also be compatible with a band which may be placed around the vehicle operator's wrist which, through, for example, radio frequency, may communicate to the onboard operating system 800, and the brain 602, if, for example, the vehicle operator's heartbeat is irregular, blood pressure is too high or low, or if other medical conditions exist which may require immediate medical attention. If the vehicle operator were to go into cardiac arrest, for example, the HPT vehicle 100 may exit the rail 108 at the next available exit and emergency personnel may be standing by to meet the HPT vehicle 100 in the with advance knowledge of vehicle operator's condition.

A HPT vehicle 100 may also incorporate a safety cage or hull that may be made of carbon fiber or any other robust material and maybe egg shaped or any other desired shape which could act as a safety mechanism for passengers in the vehicle 100. Additionally, at the front of the hull may be a train magnet which may be magnetically attached to a boom, which may connect multiple HPT vehicles 100 to the one in front of it when traveling at high speeds to reduce fuel and energy consumption.

The brain 602 may also follow the movement of each HPT vehicle in a train and should anything irregular occur, slow other vehicles accordingly, or disconnect a train at the source of trouble. Each rail compliant vehicle 100 may also have a radar type sensor to alert the occupants of a higher than usual differential speed. The driver may have an override option but its use will affect all, or most, of the vehicles in that driver's train.

In another exemplary embodiment, as the HPT vehicle 100 exits the rail 108 the brain may communicate to the HPT vehicle 100 to accelerate its conventional tires 102 to the speed corresponding to the rail 108 departure speed. After departure from the rail 108 is complete, the vehicle operator may be prompted by the onboard operating system 800 to take control of the vehicle 100, at which time the vehicle operator may regain manual control of the vehicle 100. Additionally, the drive wheels 104 may be automatically retracted into a protected and safe position or any other desired position.

In another exemplary embodiment, the rail 108 may not be affected by migrant animals, high winds, rain or snow conditions since it may be a fixed, non-flexible guideway, elevated above the debris field which accumulates on surface roadways and may be climate controlled. Exhaust emissions, noise pollution, and light pollution may also be greatly diminished.

The foregoing description and accompanying drawings illustrate the principles, preferred embodiments and modes of operation of the invention. However, the HPT system should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the HPT system as defined by the following claims.

What is claimed is:

1. A personal transit vehicle comprising:
  an enclosure;
  a plurality of road wheels coupled to the enclosure which are powered to propel the personal transit vehicle along a road;
  a plurality of substantially horizontal drive wheels coupled to the enclosure which are powered to propel the personal transit vehicle along a rail, wherein the plurality of drive wheels are powered independently of the road wheels.
  a road wheel suspension system attached to each of the plurality of road wheels, wherein the road wheel suspension controls a positioning of the road wheels;

a rail engagement system, wherein the rail engagement system couples the plurality of drive wheels of the personal transit vehicle to a rail during a rail-guided operation; and wherein the rail engagement system includes a bearing late coupled to a top of the rail, the bearing plate having a plurality of bearings that support the weight of the personal transit vehicle during rail-guided operation.

2. The personal transit vehicle of claim 1, wherein the road wheel suspension system includes an onboard computer which is configured to provide user control of the positioning of the road wheels.

3. The personal transit vehicle of claim 1, wherein the rail engagement system includes a plurality of drive wheels, wherein the drive wheels propel the personal transit vehicle along the rail.

4. The personal transit vehicle of claim 3, wherein the plurality of drive wheels rotate about a substantially vertical axis.

5. The personal transit vehicle of claim 1 further comprising:

an onboard operating system that operates the personal transit vehicle from a remote location.

6. The personal transit vehicle of claim 5, wherein the onboard operating system adjusts the power of the drive wheels.

7. The personal transit vehicle of claim 5, wherein the onboard operating system controls the road wheel suspension system.

8. A method of personal transit comprising:

driving a personal transit vehicle on a first roadway using a plurality of road wheels;

driving the personal transit vehicle from the first roadway onto a rail;

engaging a plurality of substantially horizontal drive wheels of the personal transit vehicle with the rail;

engaging a bearing plate on a top portion of the rail with the personal transit vehicle;

controlling operation of the personal transit vehicle from a remote location wherein the plurality of drive wheels are powered independently of the plurality of road wheels; and driving the personal transit vehicle from the rail onto a second roadway.

9. The method of personal transit of claim 8, wherein the controlling operation of the personal transit vehicle from a remote location, includes, transmitting operating signals through sensors on the rail, from the remote location to the personal transit vehicle.

10. The method of personal transit of claim 9, wherein the controlling operation of the personal transit vehicle from a remote location, further includes, transmitting operating conditions data from the personal transit vehicle to the remote location.

* * * * *